US010017222B2

(12) United States Patent
Carlson

(10) Patent No.: US 10,017,222 B2
(45) Date of Patent: Jul. 10, 2018

(54) BICYCLE MOUNTABLE STORAGE CONTAINER

(71) Applicant: Buca Boot LLC, Cambridge, MA (US)

(72) Inventor: Kathryn Carlson, Cambridge, MA (US)

(73) Assignee: Buca Boot LLC, Cambridge, MA (US)

( * ) Notice: Subject to any disclaimer, the term of this patent is extended or adjusted under 35 U.S.C. 154(b) by 21 days.

(21) Appl. No.: 15/021,503

(22) PCT Filed: Sep. 15, 2014

(86) PCT No.: PCT/US2014/055627
§ 371 (c)(1),
(2) Date: Mar. 11, 2016

(87) PCT Pub. No.: WO2015/039018
PCT Pub. Date: Mar. 19, 2015

(65) Prior Publication Data
US 2016/0229474 A1  Aug. 11, 2016

Related U.S. Application Data

(60) Provisional application No. 61/877,455, filed on Sep. 13, 2013.

(51) Int. Cl.
B62J 7/00  (2006.01)
B62J 9/00  (2006.01)
(Continued)

(52) U.S. Cl.
CPC ............. *B62J 9/001* (2013.01); *B62J 7/04* (2013.01); *B65D 21/083* (2013.01); *B65D 43/22* (2013.01)

(58) Field of Classification Search
CPC ... B62J 9/001; B62J 9/003; B62J 9/006; B62J 7/04; B62J 7/06; B65D 21/083; B65D 21/086
(Continued)

(56) References Cited

U.S. PATENT DOCUMENTS 963,769 A * 7/1910 Johnson ................... B65D 7/26
220/6
1,597,092 A * 8/1926 McTighe ................. B25H 3/02
206/373

(Continued)

FOREIGN PATENT DOCUMENTS

EP  2586685 A1  5/2013
JP  07-251774 A  10/1995
(Continued)

OTHER PUBLICATIONS

International Search Report and Written Opinion issued in related International Patent App. No. PCT/US2014/055627 dated Dec. 30, 2014 (10 sheets).
(Continued)

*Primary Examiner* — Derek Battisti
(74) *Attorney, Agent, or Firm* — Gesmer Updegrove LLP

(57) ABSTRACT

A bicycle mountable storage container is disclosed that includes mounting means for attaching the storage container to a bicycle, and a pair of doors on a top portion of the storage container. The storage container has an internal volume defined in party by opposing side walls, wherein the doors are movable from a closed position to an open position by generally moving away from each other, and subsequently down along the opposing side walls of the storage container.

20 Claims, 9 Drawing Sheets

(51) Int. Cl.
*B62J 11/00* (2006.01)
*B65D 43/18* (2006.01)
*B62J 7/04* (2006.01)
*B65D 21/08* (2006.01)
*B65D 43/22* (2006.01)

(58) Field of Classification Search
USPC .............. 224/429, 431; 220/259.2, 811–813
See application file for complete search history.

(56) References Cited

U.S. PATENT DOCUMENTS

| | | | | |
|---|---|---|---|---|
| 2,897,999 | A * | 8/1959 | Bishop | B65D 21/0219 206/508 |
| 2,920,802 | A * | 1/1960 | Cook | B60R 9/055 190/19 |
| 3,655,088 | A * | 4/1972 | Box | B65D 43/164 206/427 |
| 3,934,770 | A * | 1/1976 | Larsen | B62J 9/00 211/132.1 |
| 4,662,548 | A * | 5/1987 | Jackson | B62J 9/00 220/9.3 |
| 4,997,118 | A * | 3/1991 | Uebach | B60R 9/055 220/323 |
| 5,484,090 | A * | 1/1996 | Lyshkov | B62J 9/00 224/419 |
| 5,582,472 | A * | 12/1996 | Lyons | A47B 81/00 292/238 |
| 5,881,934 | A * | 3/1999 | Hung | B60R 7/043 190/109 |
| 8,333,444 | B1 * | 12/2012 | Chang | A47B 43/00 312/258 |
| 2002/0176593 | A1 * | 11/2002 | Magnusson | H04R 5/023 381/301 |
| 2006/0102669 | A1 * | 5/2006 | Fouts | B60R 9/00 224/404 |

FOREIGN PATENT DOCUMENTS

| | | |
|---|---|---|
| JP | 09-020275 A | 1/1997 |
| JP | 2006-182342 A | 7/2006 |
| JP | 2006-315650 A | 11/2006 |

OTHER PUBLICATIONS

International Preliminary Report on Patentability issued in related International Patent Application No. PCT/US2014/055627 dated Mar. 24, 2016 (9 sheets).

* cited by examiner

BICYCLE MOUNTABLE STORAGE CONTAINER

PRIORITY

The present application claims priority to PCT Application No. PCT/US2014/055627 filed Sep. 15, 2014, which claims priority to U.S. Provisional Patent Application Ser. No. 61/877,455, filed Sep. 13, 2013, the disclosures of which are hereby incorporated herein by reference in their entireties.

BACKGROUND

The invention generally relates to storage containers and relates in particular to storage containers that are mountable on a bicycle.

As bicycle use becomes more popular and more people use bicycles not just for commuting but also for shopping and other activities, it would sometimes be convenient to leave materials with the bicycle. Although baskets may be attached to the front of the bicycle, they may not be used to secure items within the basket. Bicycle panniers are also popular, but are easily removed from the bicycle, and thus do not provide a secure storage container.

There is a need, therefore, for a securable storage container that is secured to a bicycle.

SUMMARY

In accordance with an embodiment, the invention provides a bicycle mountable storage container that includes mounting means for attaching the storage container to a bicycle, and a pair of doors on a top portion of the storage container. The storage container has an internal volume defined in part by opposing side walls, wherein the doors are movable from a closed position to an open position by generally moving away from each other, and subsequently down along the opposing side walls of the storage container.

In accordance with another embodiment, the invention provides a bicycle mountable storage container that includes a pair of doors on a top portion thereof, wherein the doors are configured to be opened to an open position alongside opposing sides of the storage container, collapsible pockets that are formed between each open door and its associated side of the storage container, and mounting means for attaching the storage container to the bicycle.

In accordance with a further embodiment, the invention provides a bicycle mountable storage container that includes mounting means for attaching the storage container to the bicycle, and a pair of doors on a top portion thereof, wherein the doors are configured to be opened to an open position alongside the opposing sides of the storage container, and wherein movement of said doors is not obstructed by any of a set of the bicycle, an fender or the bicycle or a wheel of the tire of the bicycle.

In accordance with a further embodiment, the invention provides a bicycle mountable storage container that includes mounting means for attaching the storage container to the bicycle and a pair of doors on a top portion thereof, wherein the doors are movable from a closed position in which a first storage volume is provided, to an open position alongside opposing sides of the storage container, and wherein the doors, when in the open position, permit additional storage volumes to be provided in addition to the first storage volume.

In accordance with a further embodiment, the invention provides a bicycle mountable storage container that includes mounting means for attaching the storage container to the bicycle, and a pair of doors on a top portion thereof, wherein the doors are movable from a closed position to an open position alongside opposing sides of the storage container, and wherein said doors each include posts that travel along tracks within the storage container, said tracks guiding the path of the doors via the tracks as the doors are moved between the open and closed positions.

BRIEF DESCRIPTION OF THE DRAWINGS

The following descriptions may be further understood with reference to the accompanying drawings in which.

DETAILED DESCRIPTION

Figure 1:
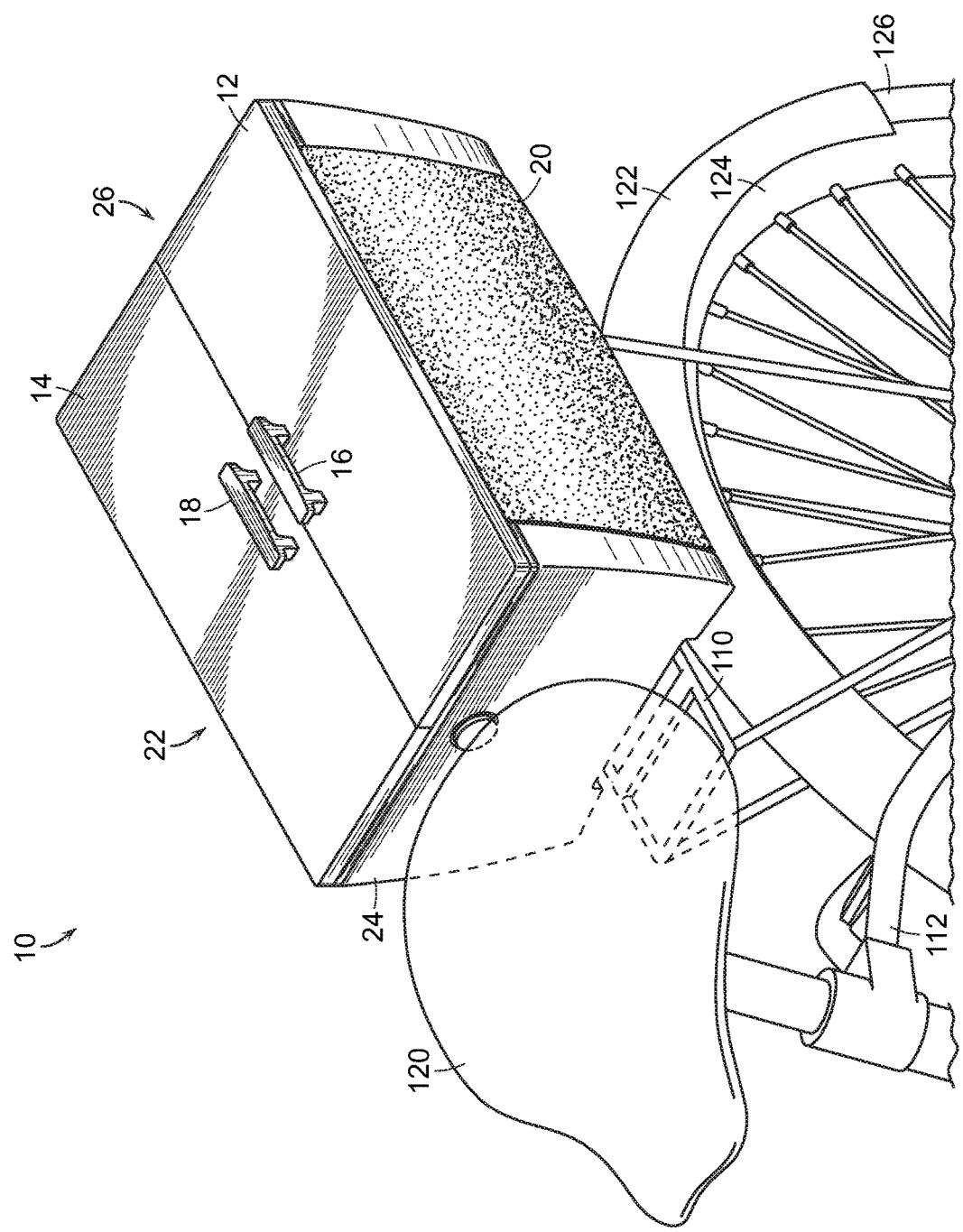
FIG. 1 shows an illustrative diagrammatic front perspective view of a bicycle mounted storage container in a closed position in accordance with an embodiment of the present invention.
Figure 2:
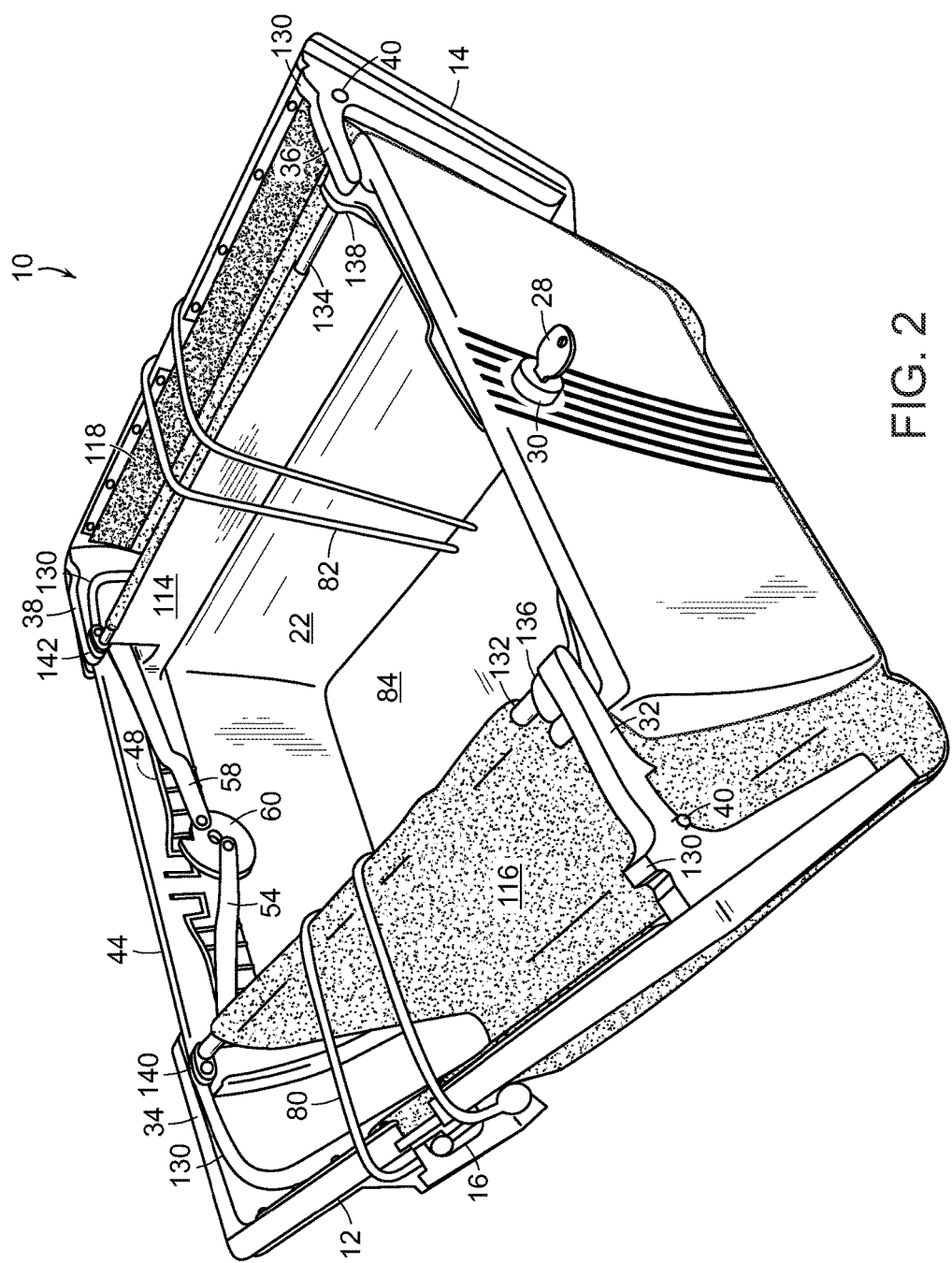
FIG. 2 shows an illustrative diagrammatic rear perspective view of the bicycle mountable storage container of FIG. 1 in a opened position.

As shown in FIGS. 1 and 2, a secure storage container that is mountable to a bicycle is shown at 10. The storage container 10 includes a pair of doors 12, 14 on a top portion of the container, and each door 12, 14 has a handle 16, 18 respectively. The container also includes left and right sides 20, 22 as well as front and rear sides 24, 26 as discussed below.

As shown in FIG. 2, when the doors 12, 14 are opened, they are positioned along the opposing sides 20, 22 of the container, providing access to a storage volume 114 within the container, as well as access to additional storage volumes 116, 118 within collapsible pockets that are suspended between each door 12, 14 and the respective side wall 20, 22. With reference again to FIG. 1, it will be seen that since the doors open alongside the opposing sides 20, 22 of the container 10, the movement of the doors 12, 14 is not obstructed by any of the seat 120, the fender 122, and the wheel 124 or the tire 126 of the bicycle 112. Because of this, the doors may remain open while the bicycle is being ridden, and may include parcels such as a package that stands within the storage volume 114 yet extends above the top of the container 10. When the container is in the open position therefore, it may be used to carry large items such as grocery bags, as well as more narrow items in the collapsible pockets. The doors may also include gasket material along the edges of that each door that contacts the other door (as well as on the inner surface of each door that contacts the tops of the walls of the container, thereby sealing the interior from moisture outside of the container when the doors are locked.

Figure 3:
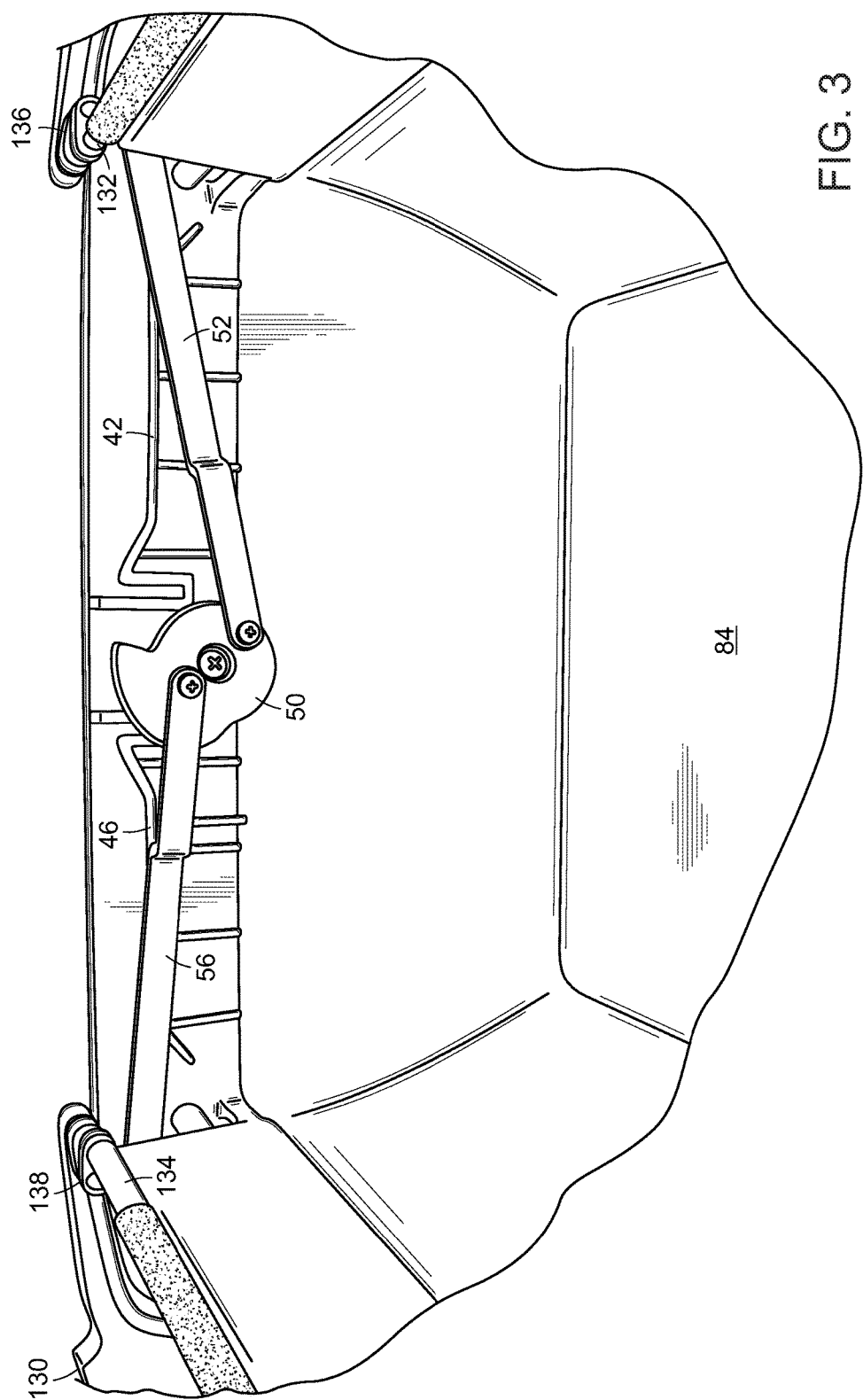
FIG. 3 shows an illustrative diagrammatic perspective view of the inner wall of the rear portion of the bicycle mountable storage container of FIG. 2.
Figure 4:
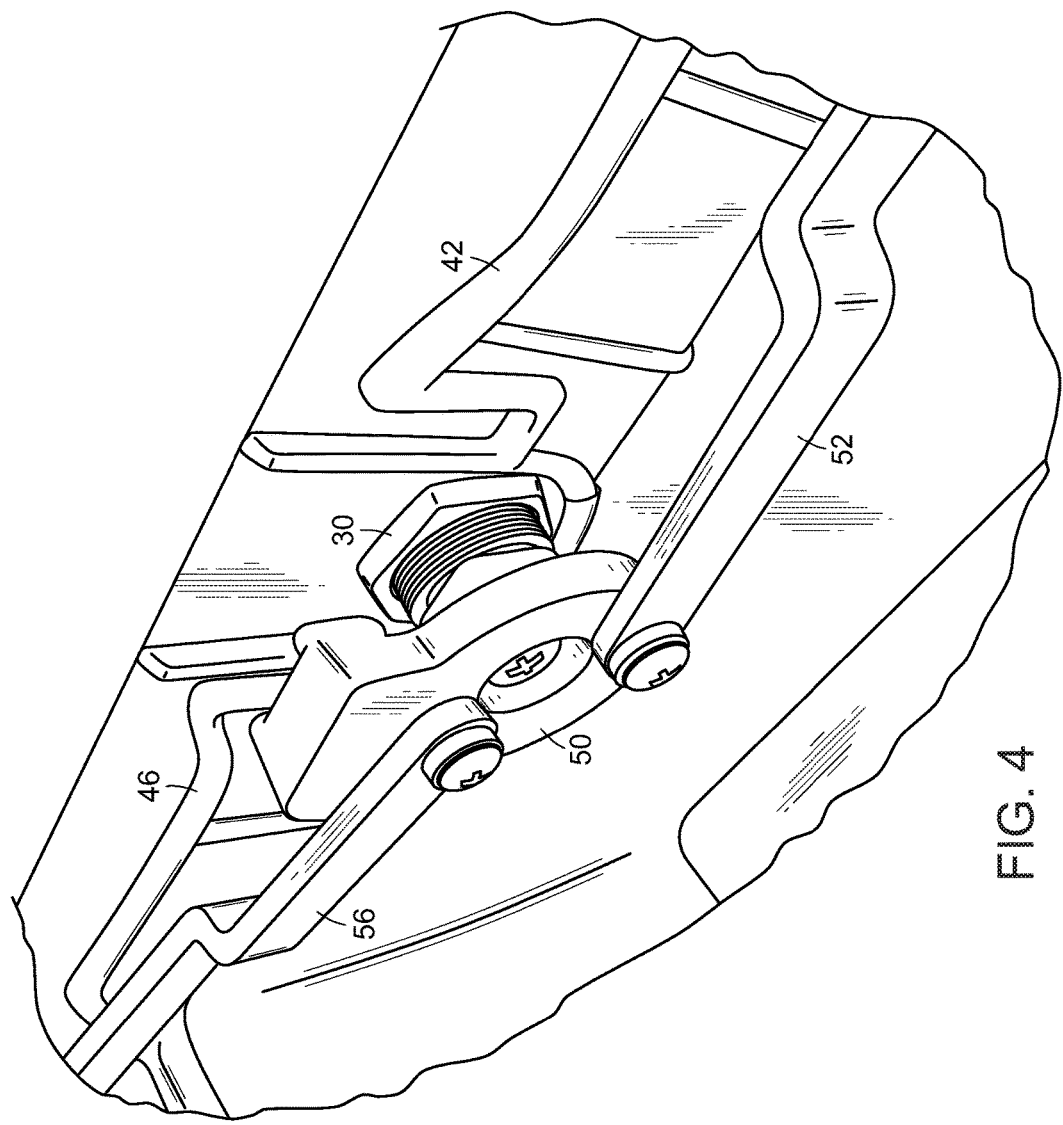
FIG. 4 shows an illustrative diagrammatic closer up view of the locking mechanism of the bicycle mountable storage container of FIG. 3.

As shown in FIGS. 2-4, the doors 12, 14 may be unlocked by turning a key 28 within a lock 30 on the rear side 26 of the container. When the key 28 turns the lock 30 into the open position, the doors 12, 14 first lift up from the container a short distance, and then may be moved away from each other to provide an opening. This movement is caused by the cam mechanism 50 releasing locking posts 130 on arms 32, 34, 36 and 38. The door 12 is attached to arms 32 and 34, and the door 14 is attached to arms 36 and 38. When the cam mechanism 50 releases the locking posts 130 on the arms 32 and 36, guide posts 40 are then permitted to move upward along guide tracks 42, 46.

As shown in FIG. 3, drive linkages 52 and 56 are attached to the cam mechanism 50, and move with the cam mechanism. When in the unlocked position, opposing ends of the drive linkages are coupled to rods 132, 134 via spring biased offset drive linkages 136 and 138, which cause the rods 132, 134 to rotate. When the rods 132, 134 rotate, offset follower linkages 140, 142 on the inside of the front side 24 of the container urge follower linkages 54, 58 to rotate a follower cam 60 that engages locking posts 130 on the arms 34, 38. This provides that the doors, when locked, are locked on both the forward and rear ends of the container. Note also that the rods 132, 134 are also used to suspend the pockets 70, 72.

Figure 5:
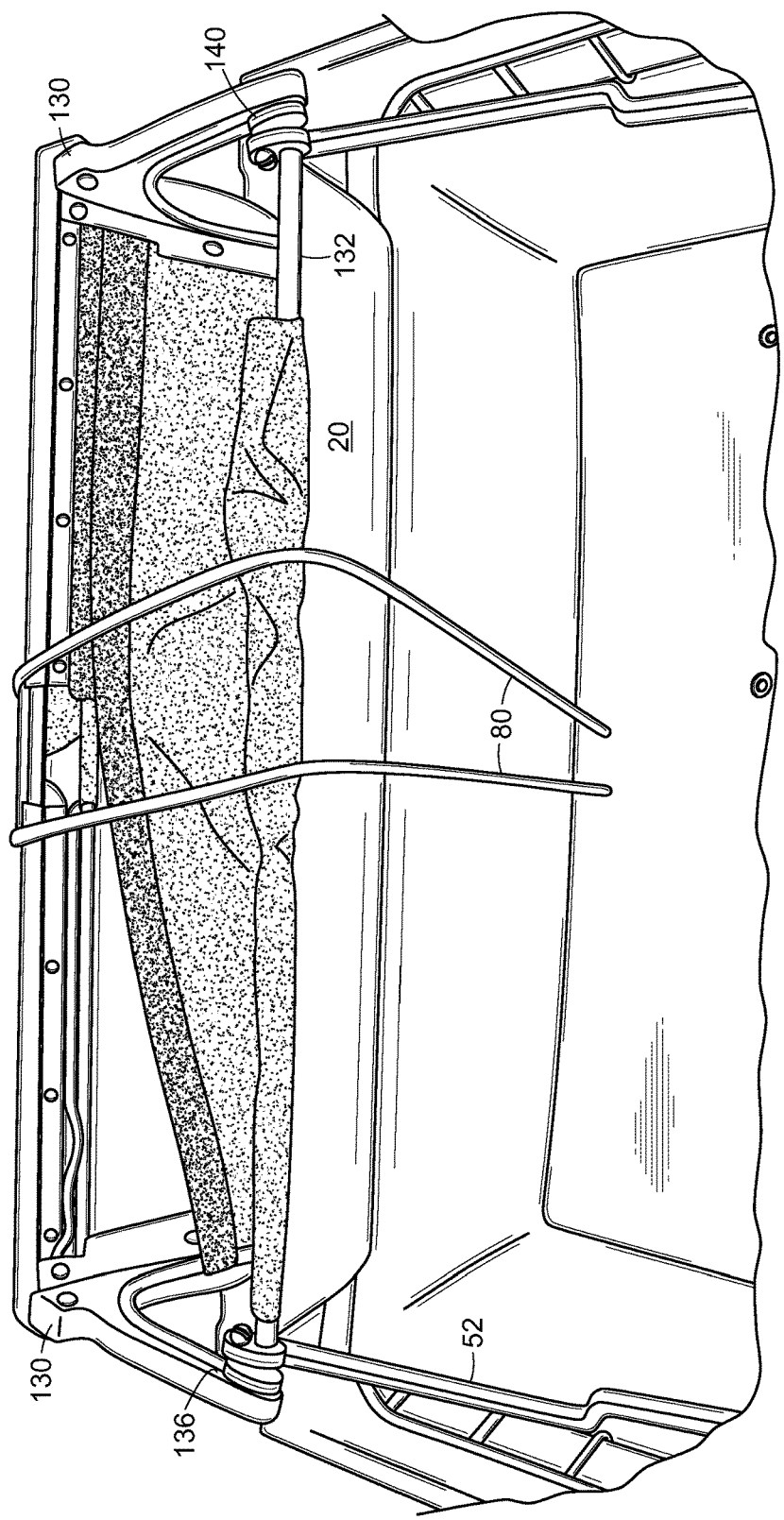
FIG. 5 shows an illustrative diagrammatic side perspective view of the left side of the bicycle mountable storage container of FIG. 2.
Figure 6:
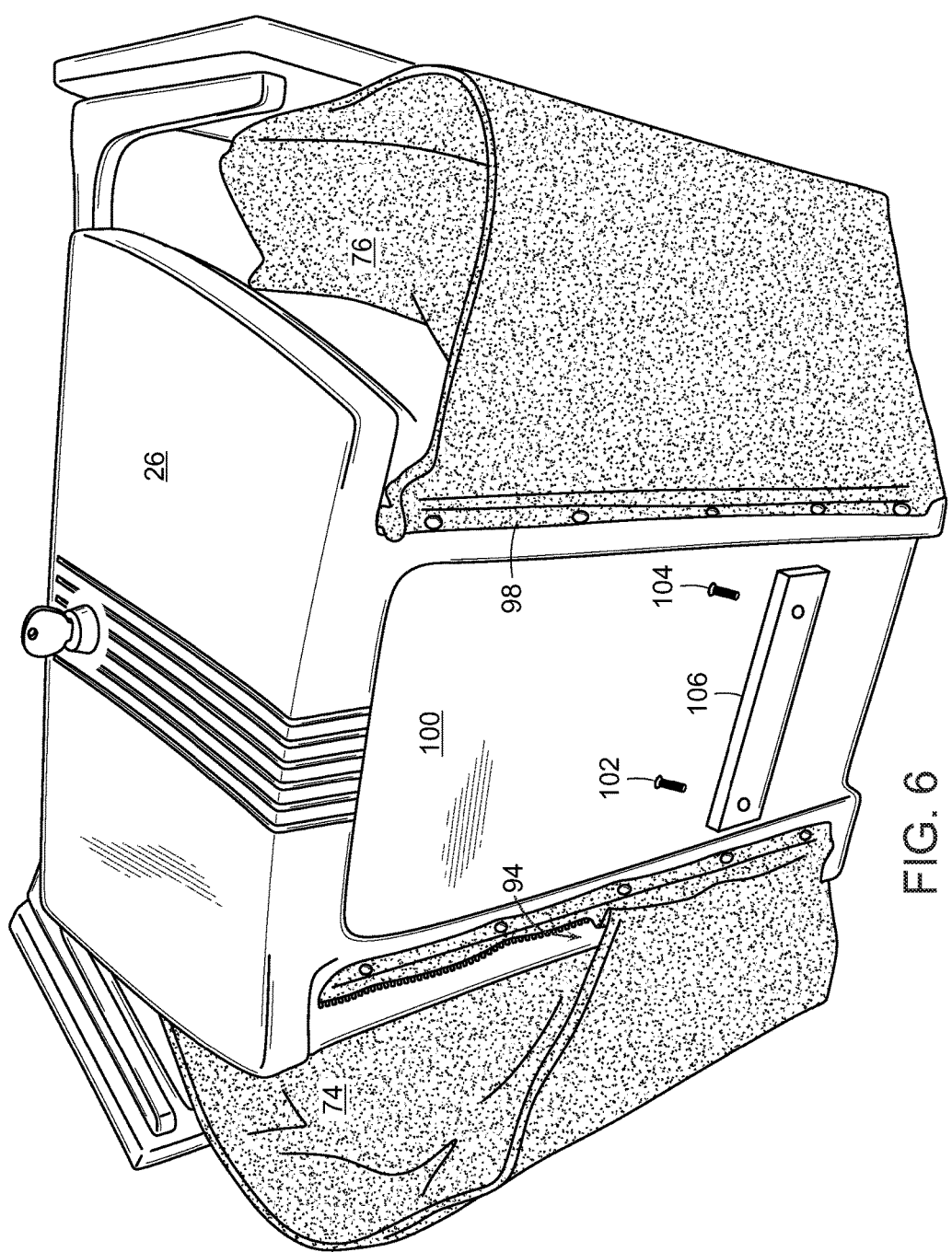
FIG. 6 shows an illustrative diagrammatic bottom perspective view of the bicycle mountable storage container of FIG. 2.

As shown in FIGS. 2, 5 and 6, when the doors are opened, a pocket 70, 72 is formed between each door 12, 14 and a respective side 20, 22 of the container. The pockets 70, 72 are formed by fabric 74, 76 that is attached to both the underside of each door 12, 14 and to the rods 132, 134 on each respective side 20, 22, as well as to the underside of each door 12, 14. The container also includes elastomeric straps 80, 82 that are fixed to the interior floor 84 of the container. The elastomeric straps 80, 82 may be pulled over items within each pocket 70, 72, and secured around a respective handle 16, 18 on a door.

As shown in FIGS. 2, 5 and 6, the fabric 74, 76 of each pocket 70, 72 may be removed from the container 10 to facilitate cleaning. In particular, a hook and loop fastener (Velcro®) 90, 92 may be provided on the fabric along each side 20, 22 of the container, and zippers 92, 94, 96, 98 may be provided on the underside of each door 12, 14 as well as on the bottom 100 of the container along each side 20, 22.

As shown in FIG. 6, the floor 84 of the container may include openings through which threaded screws 102, 104 may be provided. A fastening bar 106 is then placed below the top portion of the bicycle rack, and the threaded screws 102, 104 are then tightened into threaded openings on the fastening bar 106.

Figure 7:
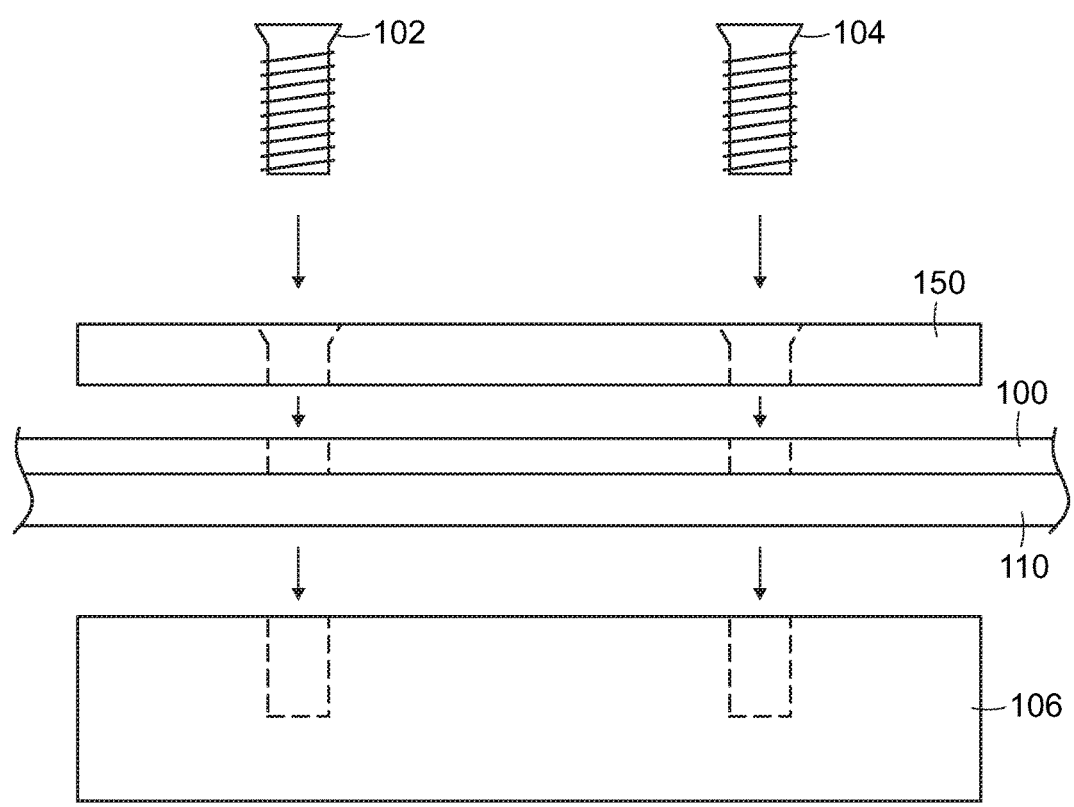
FIG. 7 shows an illustrative diagrammatic exploded side view of a mounting arrangement in accordance with another embodiment of the present invention.

As shown in FIG. 7, in addition to the fastening bar 106, in accordance with another embodiment, an additional inner fastening bar 150 may be used to sandwich the rack 110 and the bottom floor 100 of the container using the screws 102, 104.

Figure 8:
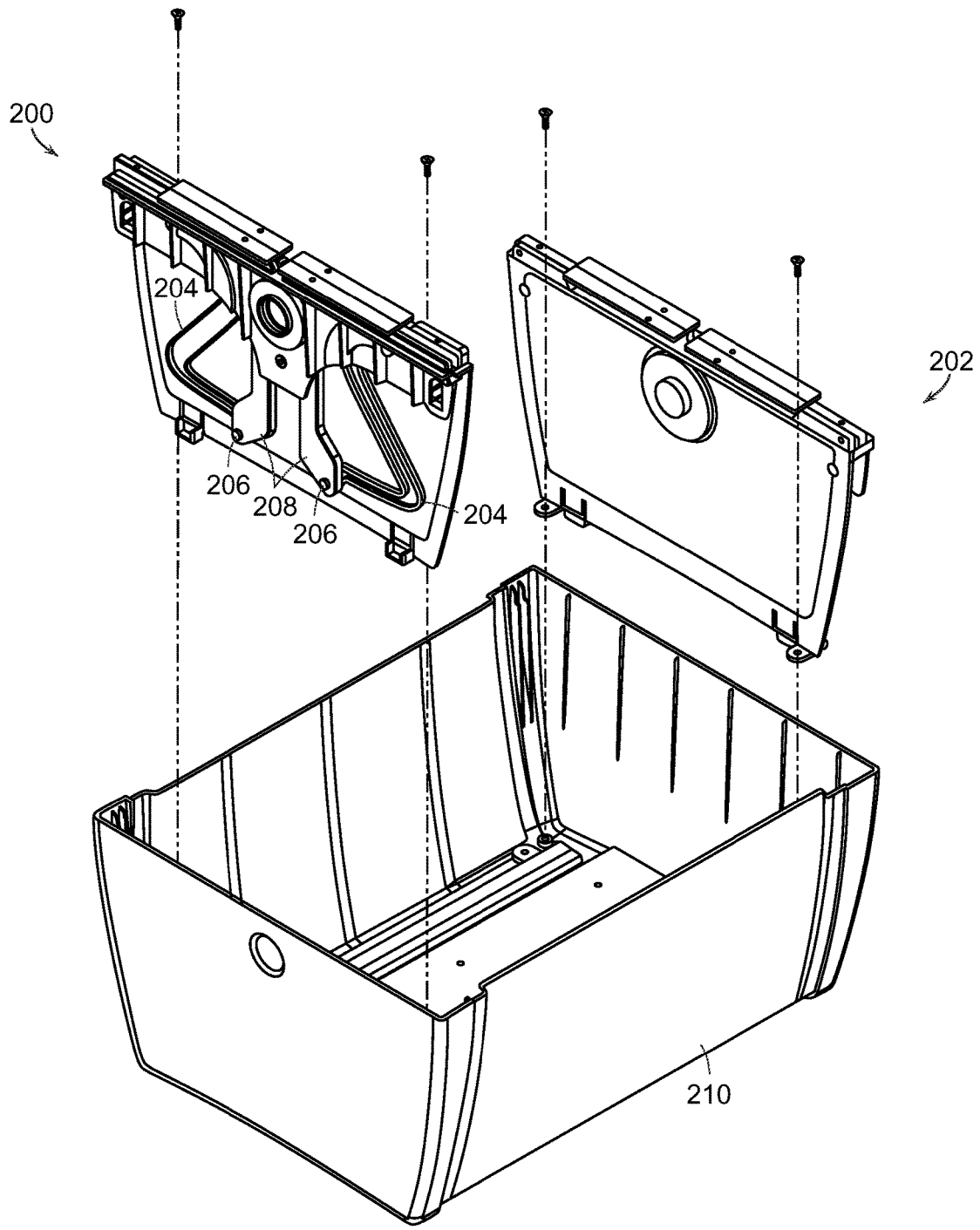
FIG. 8 shows an illustrative diagrammatic exploded view of track subassemblies for use in a bicycle mountable storage container in accordance with a further embodiment of the present invention.
Figure 9:
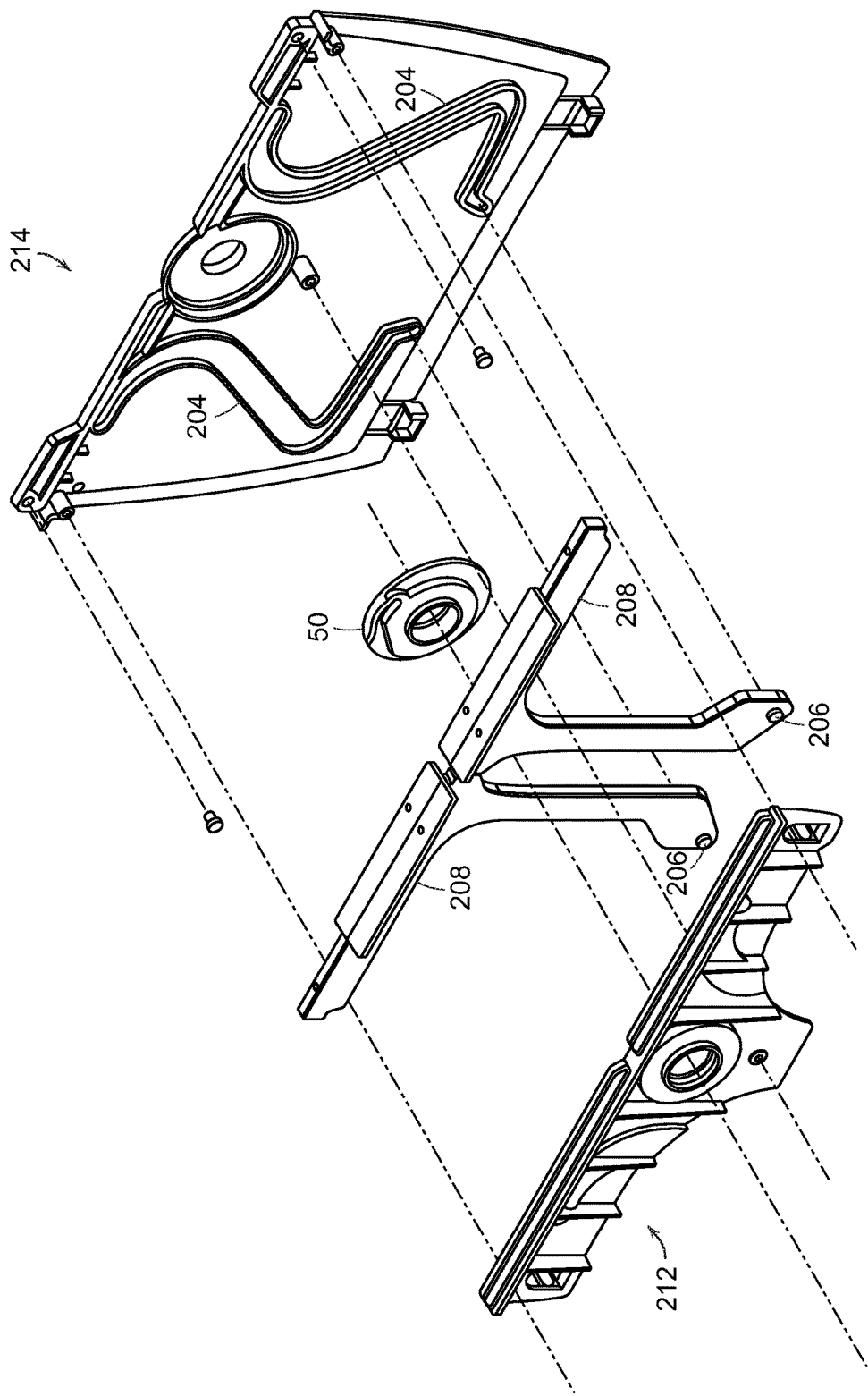
FIG. 9 shows an illustrative diagrammatic exploded view of a track subassembly of the bicycle mountable storage container of FIG. 8.

As shown in FIGS. 8 and 9, in accordance with a further embodiment, the invention may employ a different type of track system to guide the movement of the doors, and may include track subassemblies that conceal the tracks within inner walls. In particular, track subassemblies 200, 202 may be used that each include a track portions 204 along which guide posts 206 on arms 208 are guided. The track assemblies 200, 202 are mounted within the body 210 of the container as shown in FIG. 8. As shown in FIG. 9, a cam plate 212 captures the arms 206, 208 between the cam plate 212 and the container bulkhead 214. Note that the guide posts in this embodiment are provided on the lower end of the arms as shown in more detail in the exploded view of FIG. 9. The remaining portions and features of a bicycle mountable storage container in accordance with this embodiment may be the same as provided in connection with the embodiment of FIGS. 1-6.

Those skilled in the art will appreciate that numerous modifications and variations may be made to the above disclosed embodiments without departing from the spirit and scope of the present invention.

What is claimed is:

1. A storage container that is mountable to a bicycle, said storage container comprising:
    mounting means for attaching the storage container to a bicycle; and
    a pair of doors on a top portion of the storage container, said storage container having an internal volume defined in part by opposing side walls, wherein the doors are movable from a closed position to an open position by generally moving initially upward and then sliding linearly away from each other as guide posts move along guide tracks, and subsequently down along the opposing side walls of the storage container, wherein the doors are coupled to flexible collapsible material that is also coupled to the opposing side walls of the storage container to permit additional storage volumes to be provided in addition to a first storage volume within the storage container when the doors are in the open position.

2. The storage container as claimed in claim 1, wherein movement of said doors is not obstructed by any of a seat of the bicycle, a fender of the bicycle or a wheel or tire of the bicycle, and wherein said doors are configured to be permitted to remain in the open position while the bicycle is ridden.

3. A storage container that is mountable to a bicycle, said storage container comprising:
    a pair of doors on a top portion thereof, wherein the doors are configured to be opened by sliding linearly away from each other and subsequently down alongside opposing sides of the storage container, said storage container having an internal volume defined in part by the opposing side walls;
    collapsible pockets formed outside of the internal volume that are formed by collapsible material between each open door and its associated side of the storage container; and
    mounting means for attaching the storage container to a bicycle.

4. The storage container as claimed in claim 3, wherein said doors of said storage container are lockable when in the closed position.

5. The storage container as claimed in claim 3, wherein said collapsible material is removable via any of zippers or hook and loop fastener attachments.

6. The storage container as claimed in claim 3, wherein said doors first move upward, prior to sliding linearly away from each other when opened.

7. The storage container as claimed in claim 3, wherein said storage container further includes elastomeric straps that are attached to the inside of the storage container, and may be attached to handles on each door when the doors are in the open position, said straps for securing material within the collapsible pockets.

8. A storage container that is mountable to a bicycle, said storage container comprising:
    mounting means for attaching the storage container to the bicycle; and
    a pair of doors on a top portion thereof, wherein the doors are configured to be opened to an open position alongside opposing sides of the storage container, wherein movement of said doors is not obstructed by any of a seat of the bicycle, a fender or the bicycle or a wheel of tire of the bicycle by providing that the doors move initially upward and then slide linearly away from each other when being opened, and wherein the doors are coupled to flexible collapsible material that is also coupled to the opposing sides of the storage container to permit additional storage volumes in addition to a first storage volume within the storage container, to be provided when the doors are in the open position.

9. The storage container as claimed in claim 8, wherein said flexible collapsible material form collapsible pockets that are formed between each door when opened and an associated side of the storage container.

10. The storage container as claimed in claim 8, wherein said doors first move upward, and then generally away from each other when opened.

11. The storage container as claimed in claim 9, wherein said doors, when in the open position, protect the collapsible pockets.

12. A storage container that is mountable to a bicycle, said storage container comprising:
    mounting means for attaching the storage container to the bicycle; and
    a pair of doors on a top portion thereof, wherein the doors are slidingly linearly movable from a closed position in which a first storage volume is provided, and are subsequently movable to an open position alongside opposing sides of the storage container, and wherein the doors are coupled to flexible collapsible material that is also coupled to the opposing sides of the storage container to permit additional storage volumes to be provided in addition to the first storage volume when the doors are in the open position.

13. The storage container as claimed in claim 12, wherein said additional storage volumes are provided by collapsible pockets.

14. The storage container as claimed in claim 13, wherein said doors, when in the open position, protect the collapsible pockets.

15. The storage container as claimed in claim 12, wherein movement of said doors is not obstructed by any of a seat of the bicycle, a fender of the bicycle or a wheel or tire of the bicycle.

16. A storage container that is mountable to a bicycle, said storage container comprising:
    mounting means for attaching the storage container to the bicycle; and
    a pair of doors on a top portion thereof, wherein the doors are movable from a closed position to an open position alongside opposing sides of the storage container, wherein said doors each include posts that travel along tracks within the storage container, said tracks guiding the path of the doors via the tracks initially upward and then linearly away from each other as the doors are moved from a closed position to an open position, and wherein the doors are coupled to flexible collapsible material that is also coupled to the opposing sides of the storage container to permit additional storage volumes to be provided in addition to a first storage volume within the storage container when the doors are in the open position.

17. The storage container as claimed in claim 16, wherein the doors are movable from the closed position to the open position by generally moving away from each other, and subsequently down along opposing sides of the storage container.

18. The storage container as claimed in claim 17, wherein said doors first move upward, and then generally away from each other when opened.

19. The storage container as claimed in claim 16, wherein movement of said doors is not obstructed by any of a seat of a bicycle, a fender of the bicycle or a wheel or tire of the bicycle.

20. The storage container as claimed in claim 16, wherein said storage container further includes collapsible pockets that are formed between each door when opened and an associated side of the storage container.

* * * * *